(12) United States Patent  (10) Patent No.: US 7,801,848 B2
Hazlewood et al.  (45) Date of Patent: Sep. 21, 2010

(54) REDISTRIBUTING A DISTRIBUTED DATABASE

(75) Inventors: Kristin Marie Hazlewood, Austin, TX (US); John Mark McConaughy, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 11/832,966

(22) Filed: Aug. 2, 2007

(65) Prior Publication Data

US 2009/0037427 A1 Feb. 5, 2009

(51) Int. Cl.
 *G06F 17/30* (2006.01)
(52) U.S. Cl. ...................................... 707/609
(58) Field of Classification Search ............ 707/2, 707/3, 10, 700; 709/204
See application file for complete search history.

(56) References Cited

U.S. PATENT DOCUMENTS

| 5,634,125 | A | * | 5/1997 | Li | 707/203 |
| 2002/0078163 | A1 | * | 6/2002 | Gregg | 709/216 |
| 2005/0193229 | A1 | * | 9/2005 | Garg et al. | 714/4 |
| 2006/0095945 | A1 | * | 5/2006 | Carpenter et al. | 725/87 |
| 2008/0095369 | A1 | * | 4/2008 | Lucidarme | 380/277 |

* cited by examiner

*Primary Examiner*—Etienne P LeRoux
(74) *Attorney, Agent, or Firm*—Yee & Associates, P.C.; Jeffrey S. LaBaw

(57) ABSTRACT

Illustrative embodiments provide a method for redistributing data in a distributed database. The method provides a set of servers, each of which having a respective portion of the distributed database resident thereon, and for routing requests to the set of servers by means of a proxy server. Responsive to a redistribution request to redistribute the distributed database among the set of servers from a first distribution to a second distribution, setting a flag in the proxy server indicating that redistribution is in progress. Further storing configuration data for the first distribution and the second distribution in the proxy server, and redistributing the data in the distributed database in accordance with the configuration data.

15 Claims, 12 Drawing Sheets

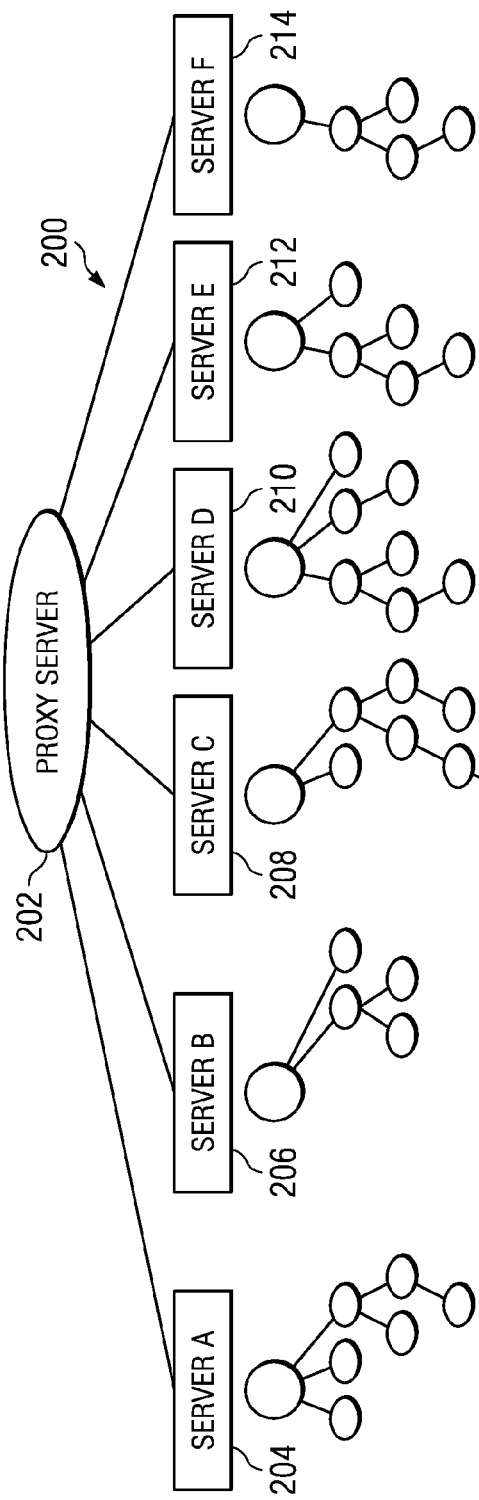
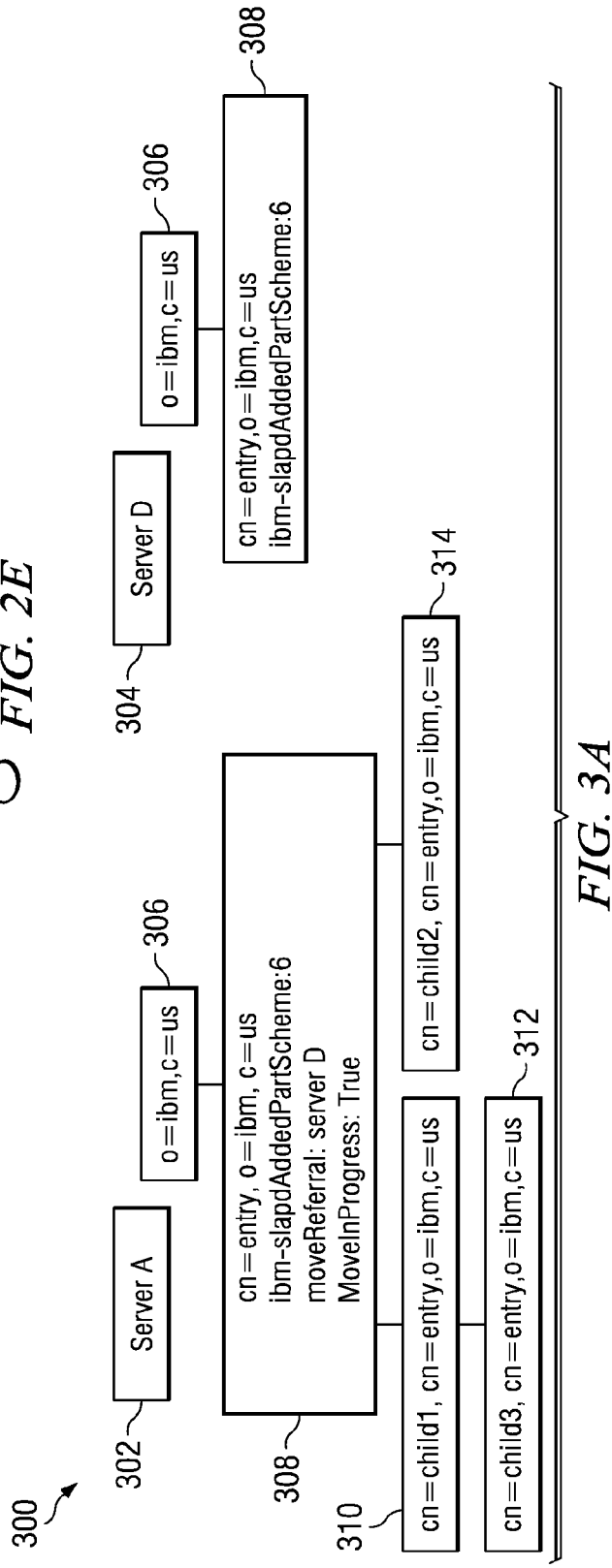
FIG. 2E
FIG. 3A dn: cn=Proxy Backends, cn=IBM Directory, cn=Schemas, cn=Configuration
cn: Proxy Backends
MoveInProgress: <TRUE or FALSE> ~410
objectclass: top
objectclass: container dn: cn=ProxyDB, cn=Proxy Backends, cn=IBM Directory, cn=Schemas, cn=Configuration
cn: Proxy Backend
ibm-slapdDNPartitionPlugin: libldapdnhash.a dnHashInit ⌐412
ibm-slapdPlugin: database libback-proxy.a proxy_backend_init
ibm-slapdSuffix: o=ibm
objectclass: top
objectclass: ibm-slapdConfigEntry
objectclass: ibm-slapdProxyBackend dn: cn=Server1, cn=proxyDB, cn=Proxy Backends, cn=IBM Directory, cn=Schemas ~414
cn=Configuration
cn: Server1
ibm-slapdProxyBindMethod: Simple
ibm-slapdProxyConnectionPoolSize: 15
ibm_slapdProxyDN: cn=root
ibm-slapdProxyPW: Password
ibm-slapdProxyTargetURL: ldap://hostname
objectClass: top
objectClass: ibm-slapdProxyBackendServer
objectClass: ibm-slapdConfigEntry
         o
         o
         o
dn: cn=o\=ibm split, cn=ProxyDB, cn=Proxy Backends, cn=IBM Directory,
cn=Schemas,
cn=Configuration
cn: o=ibm split
ibm-slapdProxyNumPartitions: 3 ⌐416
ibm-slapdProxyPartitionBase: o=ibm ~418
objectclass: top
objectclass:ibm-slapdConfigEntry
objectclass: ibm-slapdProxyBackendSplitContainer dn:cn=split1, cn=o\=ibm split, cn=ProxyDB, cn=Proxy Backends, cn=IBM Directory,
cn=Schemas,
cn=Configuration
cn: split1
ibm-slapdProxyBackendServerDN: cn=Server1,cn=ProxyDB,cn=Proxy Backends,cn=IBM Directory,cn=Schemas,

FROM FIG. 4B-1

```
cn=configuration
ibm-slapdProxyPartitionIndex: 1   ~420
objectclass: top
objectclass: ibm-slapdConfigEntry
objectclass: ibm-slapdProxyBackendSplit
                o
                o
                o
dn: cn=split3, cn=o\=ibm split, cn=ProxyDB, cn=Proxy Backends, cn=IBM Directory,
cn=Schemas,
cn=Configuration
cn: split1
ibm-slapdProxyBackendServerDN: cn=Server1,cn=ProxyDB,cn=Proxy Backends,cn=IBM
Directory,cn=Shemas,
cn=Configuration
ibm-slapdProxyPartitionIndex: 3
objectclass: top
objectclass: ibm-slapdConfigEntry
objectclass: ibm-slapdProxyBackendSplit                               422 dn: cn=NewPartitioning, cn=ProxyDB, cn=Proxy Backends, cn=IBM Directory, cn=Schemas,
cn=Configuration
cn: Proxy Backend
ibm-slapdDNPartitionPlugin: libldapdnhash.a dnHashInit
ibm-slapdPlugin: database libback-proxy.a proxy_backend_init
ibm-slapdSuffix: o=ibm
objectclass: top
objectclass: ibm-slapdConfigEntry
objectclass: ibm-slapdProxyBackend dn: cn=Server1, cn=NewPartitioning, cn=ProxyDB, cn=Proxy Backends, cn=IBM Directory,
cn=Schemas, ~424
cn: Server1
ibm-slapdProxyBindMethod: Simple
ibm-slapdProxyConnectionPoolSize: 15
ibm_slapdProxyDN: cn=root
ibm-slapdProxyPW: Password
ibm-slapdProxyTargetURL: ldap://hostname
objectClass: top
objectClass: ibm-slapdProxyBackendServer
objectClass: ibm-slapdConfigEntry
                o
                o
                o
```

FROM FIG. 4B-2 dn: cn=Server6, cn=New Partitioning, cn=ProxyDB, cn=Proxy Backends, cn= IBM Directory,
cn=Schemas,
cn=Configuration
cn: Server1
ibm-slapdProxyBindMethod: Simple
ibm-slapdProxyConnectionPoolSize: 15
ibm_slapdProxyDN: cn=root
ibm-slapdProxyPW: Password
ibm-slapdProxyTargetURL: ldap://hostname6
objectClass: top
objectClass: ibm-slapdProxyBackendServer
objectClass: ibm-slapdConfigEntry dn: cn=o\=ibm split, cn=New Partitioning, cn=ProxyDB, cn=Proxy Backends,
cn=IBM Directory, cn=Schemas, ～426
cn=Configuration
cn: o=ibm split
ibm-slapdProxyNumPartitions: 6 ╱428
ibm-slapdProxyPartitionBase: o=ibm ～430
objectclass: top
objectclass: ibm-slapdConfigEntry
objectclass: ibm-slapdProxyBackendSplitContainer                432 dn:cn=split1, cn=o\=ibm split, cn=NewPartitioning, cn=ProxyDB, cn=Proxy Backends,
cn=IBM Directory,
cn=Schemas, cn=Configuration
cn: split1
ibm-slapdProxyBackendServerDN: cn=Server1,cn=ProxyDB,cn=Proxy Backends,cn=IBM
Directory,cn=Schemas,cn=Configuration
ibm-slapdProxyPartitionIndex: 1
objectclass: top
objectclass: ibm-slapdConfigEntry
objectclass: ibm-slapdProxyBackendSplit
　　　　　　o
　　　　　　o
　　　　　　o
dn: cn=split6, cn=o\=ibm split, cn=NewPartitioning, cn=ProxyDB, cn=Proxy Backends,
cn=IBM Directory,cn=Schemas,
cn=Configuration
cn: split1
ibm-slapdProxyBackendServerDN: cn=Server6,cn=ProxyDB,cn=Proxy Backends,cn=IBM
Directory,cn=Shemas,cn=configuration
ibm-slapdProxyPartitionIndex: 6 ～434
objectclass: top
objectclass: ibm-slapdConfigEntry
objectclass: ibm-slapdProxyBackendSplit

*FIG. 4B-3*

REDISTRIBUTING A DISTRIBUTED DATABASE

BACKGROUND OF THE INVENTION

1. Field of the Invention

The present invention relates generally to an improved data processing system and in particular for managing data in a distributed directory service. Still more particularly the present invention provides a method, system and computer program product for repartitioning data in a Lightweight Directory Access Protocol (LDAP) distributed directory.

2. Description of the Related Art

LDAP is an application protocol designed for use in the query and modification of directory services in a Transmission Control Program/Internet Protocol (TCP/IP) environment. A directory service provides a directory in the form of a set of information with similar attributes organized in a logical and hierarchical manner. The most common example is the common telephone directory, in which is found a series of names arranged alphabetically, with an associated street address and phone number.

An LDAP directory tree may reflect other methods of organization depending on the model chosen. LDAP deployments typically use Domain Name System (DNS) names for structuring the upper levels of the naming hierarchy while inside the directory other entries are found which represents a leaf-like entry (or multiple entries).

An entry consists of a set of attributes wherein an attribute has a name perhaps as an attribute type or description accompanied by one or more associated values. Each entry has a unique identifier known as the entry's Distinguished Name (DN). The Distinguished Name for an entry consists of an entry's Relative Distinguished Name (RDN) that was created from the attributes of the respective entry, and the Distinguished Name for the parent entry. As entries or attributes are added, the data content of the tree structure grows.

Distributed LDAP Directories partition data based on DN hashing, or filtering. When the number of levels, entries and attributes in Distributed LDAP Directories grow, time taken to find a desired entry increases. There needs to be a way to arrange the data for efficient searching and retrieval while keeping the system online with minimum impact on performance.

SUMMARY OF THE INVENTION

Illustrative embodiments provide a computer implemented method for redistributing data in a distributed database comprising, routing requests to a set of servers by means of a proxy server, wherein each server of the set of servers having a respective portion of the distributed database resident thereon. Responsive to a redistribution request to redistribute the distributed database among the set of servers from a first distribution to a second distribution, setting a flag in the proxy server indicating that redistribution is in progress. Further storing configuration data for the first distribution and the second distribution in the proxy server and redistributing the data in the distributed database in accordance with the configuration data.

In another aspect of an embodiment of the present invention there is a data processing system for redistributing data in a distributed database, the data processing system comprising, a set of servers each of which having a respective portion of the distributed database resident thereon. A router, routing requests to the set of servers by means of a proxy server, an attribution means responsive to a redistribution request to redistribute the distributed database among the set of servers from a first distribution to a second distribution, and setting a flag in the proxy server indicating that redistribution is in progress. Further storage means for storing configuration data for the first distribution and the second distribution in the proxy server, and a distributor for redistributing the data in the distributed database in accordance with the configuration data.

In yet another aspect of an embodiment of the present invention there is a computer program product for redistributing data in a distributed database, embodied in a recordable type medium, the computer program product comprising computer executable instructions comprising computer executable instructions for routing requests to a set of servers by means of a proxy server, wherein each server of the set of servers having a respective portion of the distributed database resident thereon. Computer executable instructions responsive to a redistribution request to redistribute the distributed database among the set of servers from a first distribution to a second distribution, setting a flag in the proxy server indicating that redistribution is in progress. Computer executable instructions for storing configuration data for the first distribution and the second distribution in the proxy server, and computer executable instructions for redistributing the data in the distributed database in accordance with the configuration data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A-2E are block diagrams of a time series view of repartitioning of a plurality of directory servers in accordance with illustrative embodiments;

FIGS. 3A-3C are block diagrams of a sub-tree move in accordance with illustrative embodiments;

FIG. 4A is block diagram of routing tables and FIGS. 4B1-4B3 are a representative sample of a configuration for a proxy server during a move in progress in accordance with illustrative embodiments.

DETAILED DESCRIPTION OF THE PREFERRED EMBODIMENT

Figure 1:
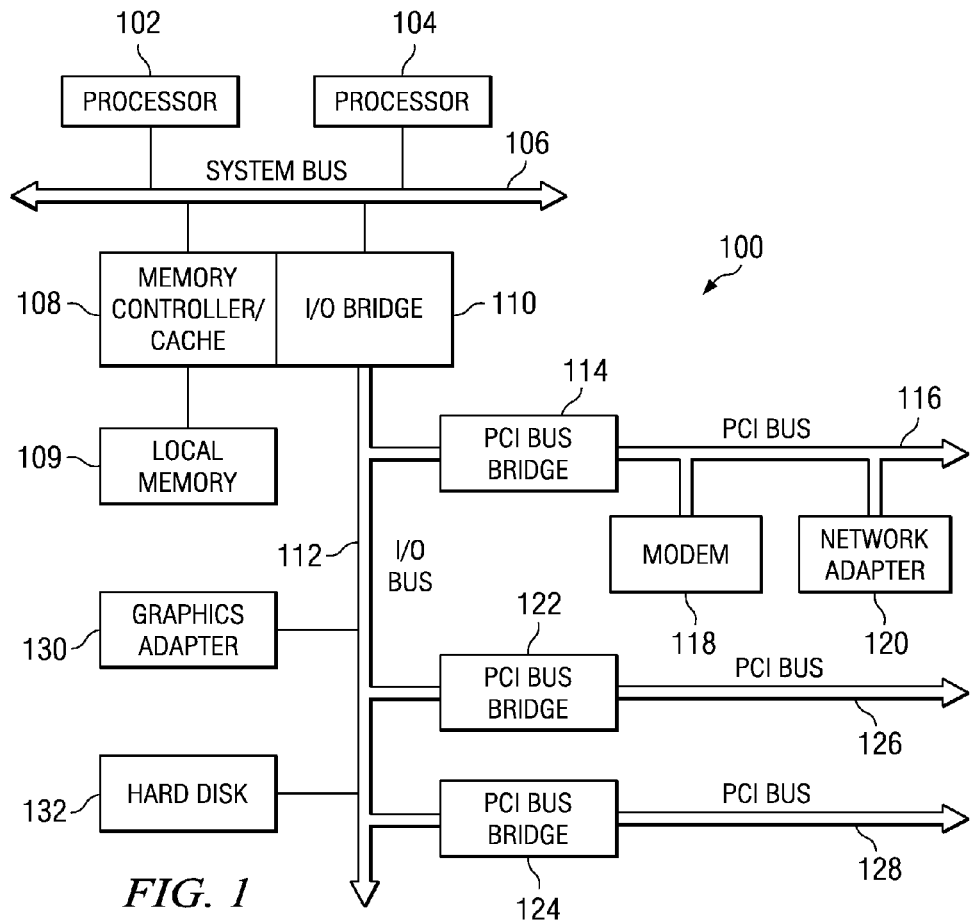
FIG. 1 is block diagram of a data processing system in accordance with illustrative embodiments.

With reference now to the figures, and in particular with reference to FIG. 1, a schematic diagram of a data processing system in accordance with an embodiment of the present invention is depicted.

Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCT local bus 116. A number of modems 118-120 may be connected to PCI bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, system 100 allows connections to multiple network computers. The replication of systems and connections among them form a collection of interconnected distributed systems such as those comprising proxy servers and distributed directory services servers in accordance with an embodiment of the present invention. A memory mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

Figure 2A:
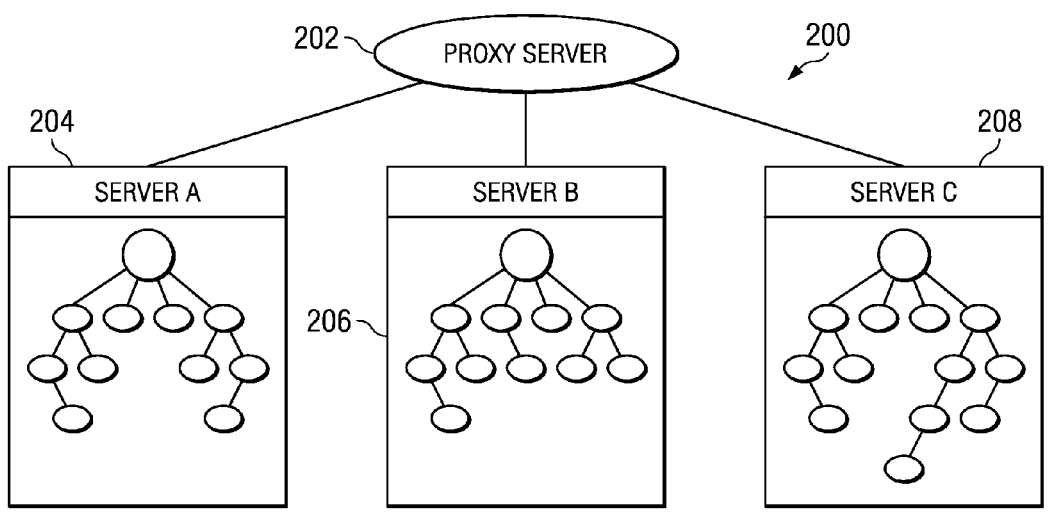

With reference to FIGS. 2A-2E, a series of events related to the repartitioning of directory entries in accordance with an embodiment of the present invention is depicted. FIG. 2A represents the starting point of data repartitioning of directory service 200. Proxy server 202 is in communication with back-end directory servers 204,206 and 208 illustrating a split in data across the three partitions. Each of servers 204, 206 and 208 has a representative tree-like structure shown depicting the data content within their respective partitions.

Figure 2B:
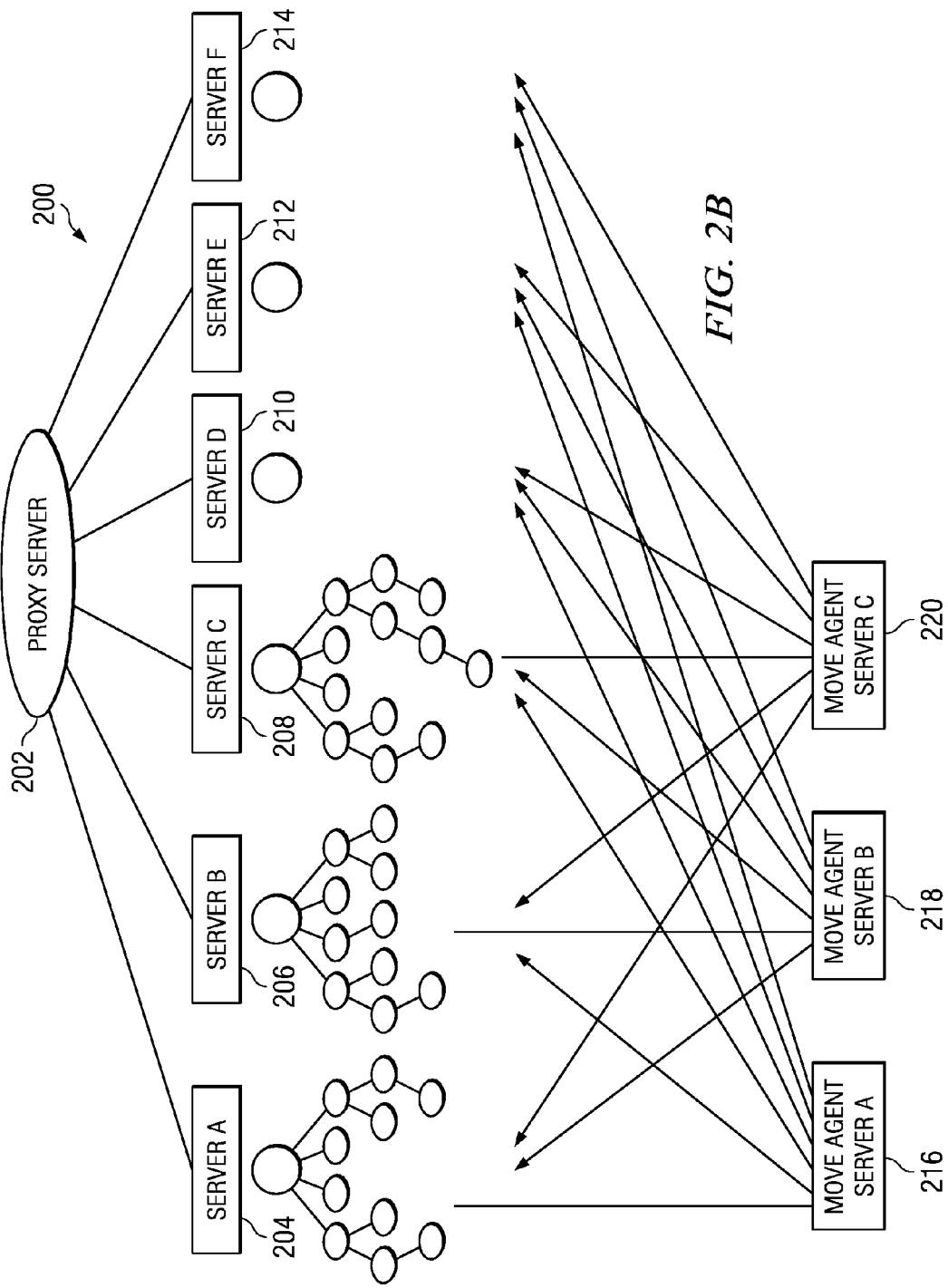

With reference to FIG. 2B, three additional back-end directory servers 210, 212, and 214 have been added in communication with proxy server 202. Each of the new servers 210, 212, and 214 has been started with the suffix entry but no data has been loaded. In addition three move agents 216, 218 and 220 with connections to all servers are present. Note that proxy server 202 indicates a "move in progress" mode status.

Figure 2C:
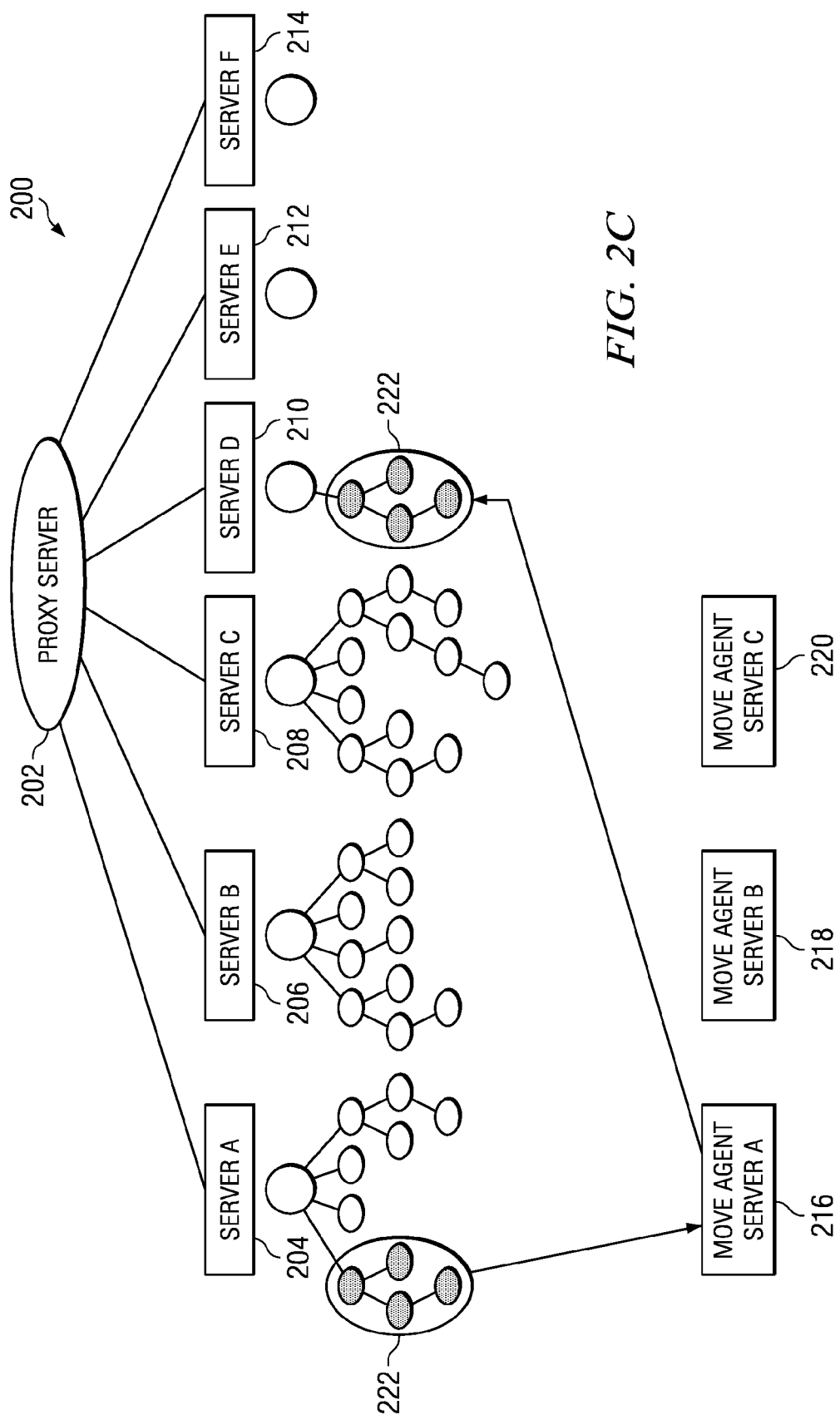

With reference to FIG. 2C, move agent 216 is in the process of moving sub-tree 222 from server 204 to a new location on recently added server 210.

Figure 2D:
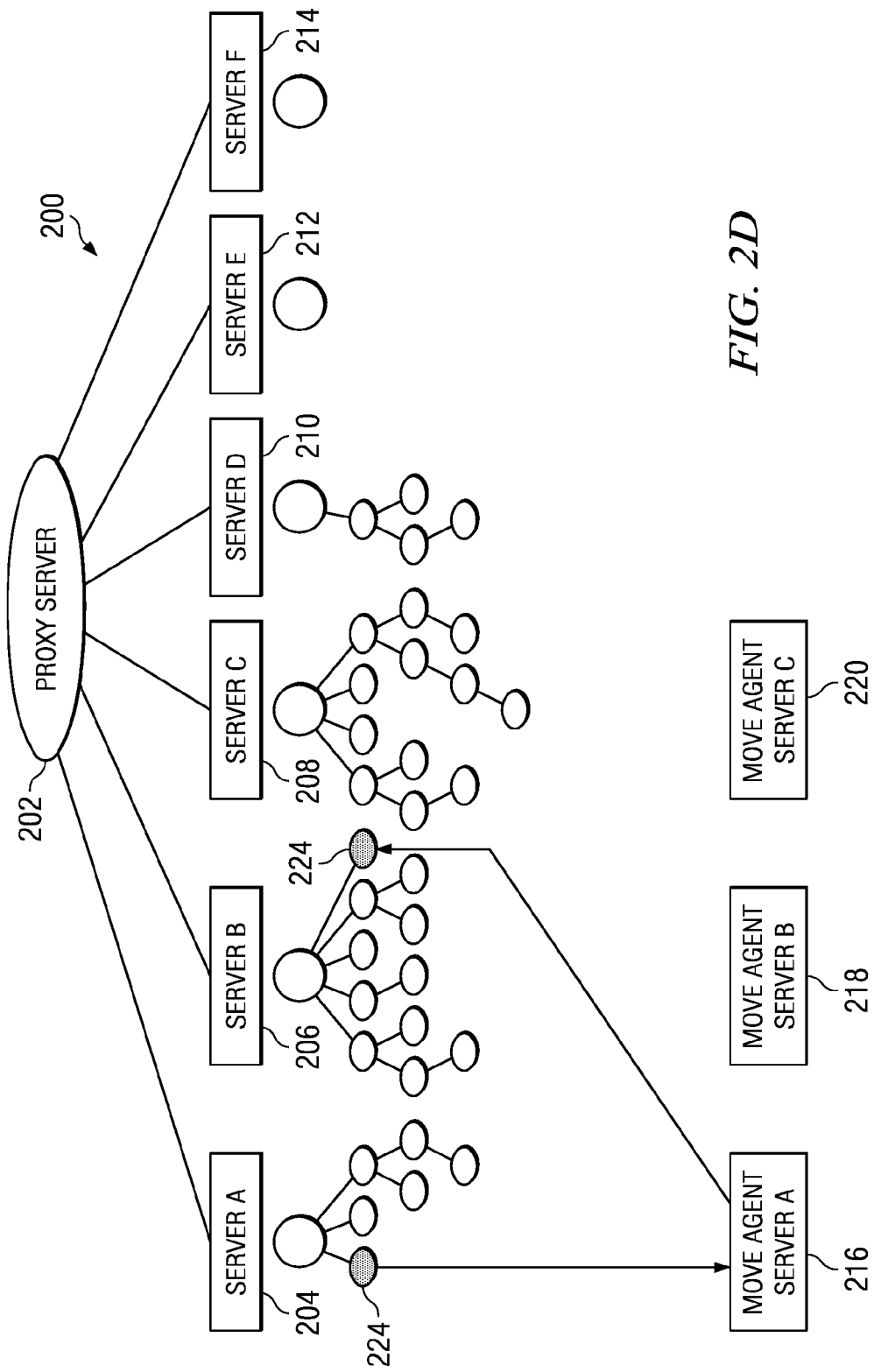

With reference to FIG. 2D, move agent 216 is in the process of moving sub-tree 224 from server 204 to new location of previously used server 206.

With reference to FIG. 2E, the process of moving sub-trees from previously existing servers 204, 206 and 208 has been completed with the directory data now dispersed over servers 204-214. Proxy server 202 no longer shows the "move in progress" mode status as during the move activity.

Figure 3B:
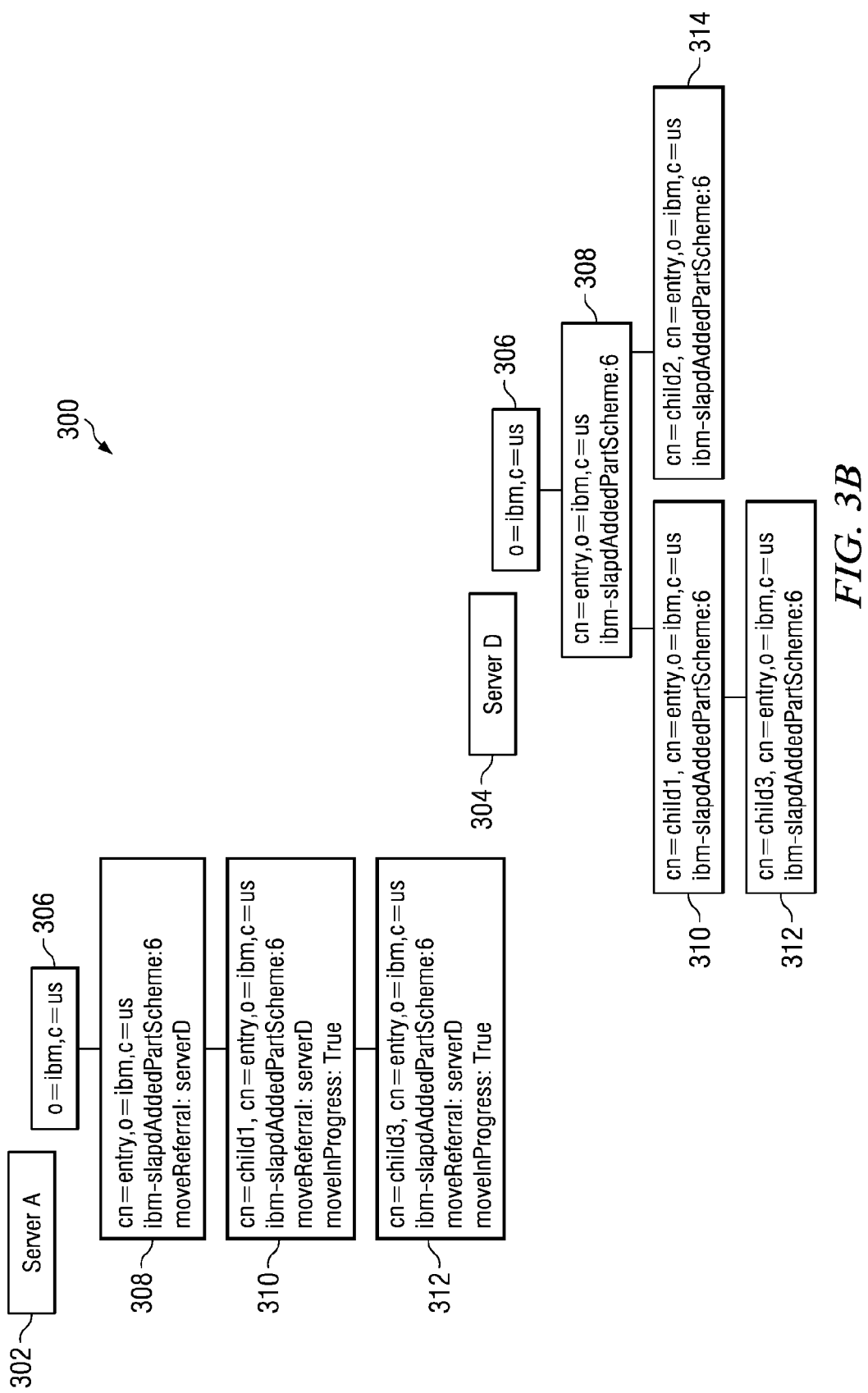
Figure 3C:
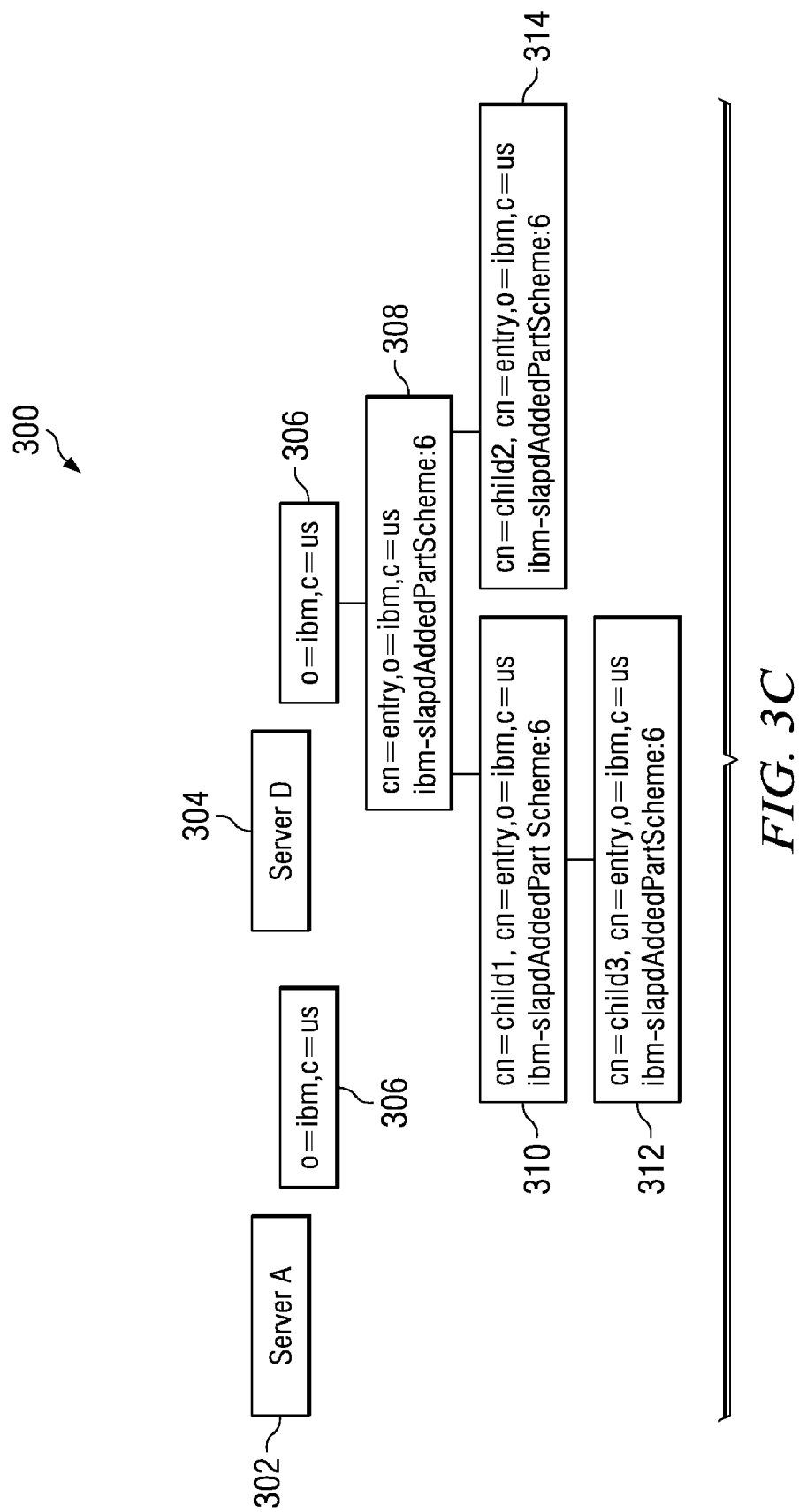

Referring now to FIGS. 3A-3C, a number of directory entries of a sub-tree are moved between servers of directory configuration 300 while making use of ghost entries in accordance with illustrative embodiments. The move begins in FIG. 3A with parent 308 having child entries 310, 312 and 314 all located on server 302 under qualifier 306. Qualifier 306 also exists on server 304. Parent 308 on server 302 is marked with an attribute indicating it was moved to server 304 (serverD) and an attribute indicating the "move in progress" status of true. This "move in progress" attribute will remain true until the move has been completed to server 304. Server 304 also has relocated the entry of parent 308 absent child entries 310, 312 and 314.

With reference to FIG. 3B, parent 308 has completed the move to server 304 and no longer has a "move in progress" attribute. Child 314 of parent 308 has completed a move to server 304. Children 310 and 312 have not completed the move as indicated by the attribute referring to server 304 and "move in progress" attribute of true for each. Entries exist on server 304 for child 310 and 312 but the move has not completed.

With reference to FIG. 3C, the move has been completed for the sub-tree as indicated by the entries for parent 308 and children 310, 312 and 314. Each of the moved entries has neither a referral nor a move in progress true attribute.

Figure 4A:
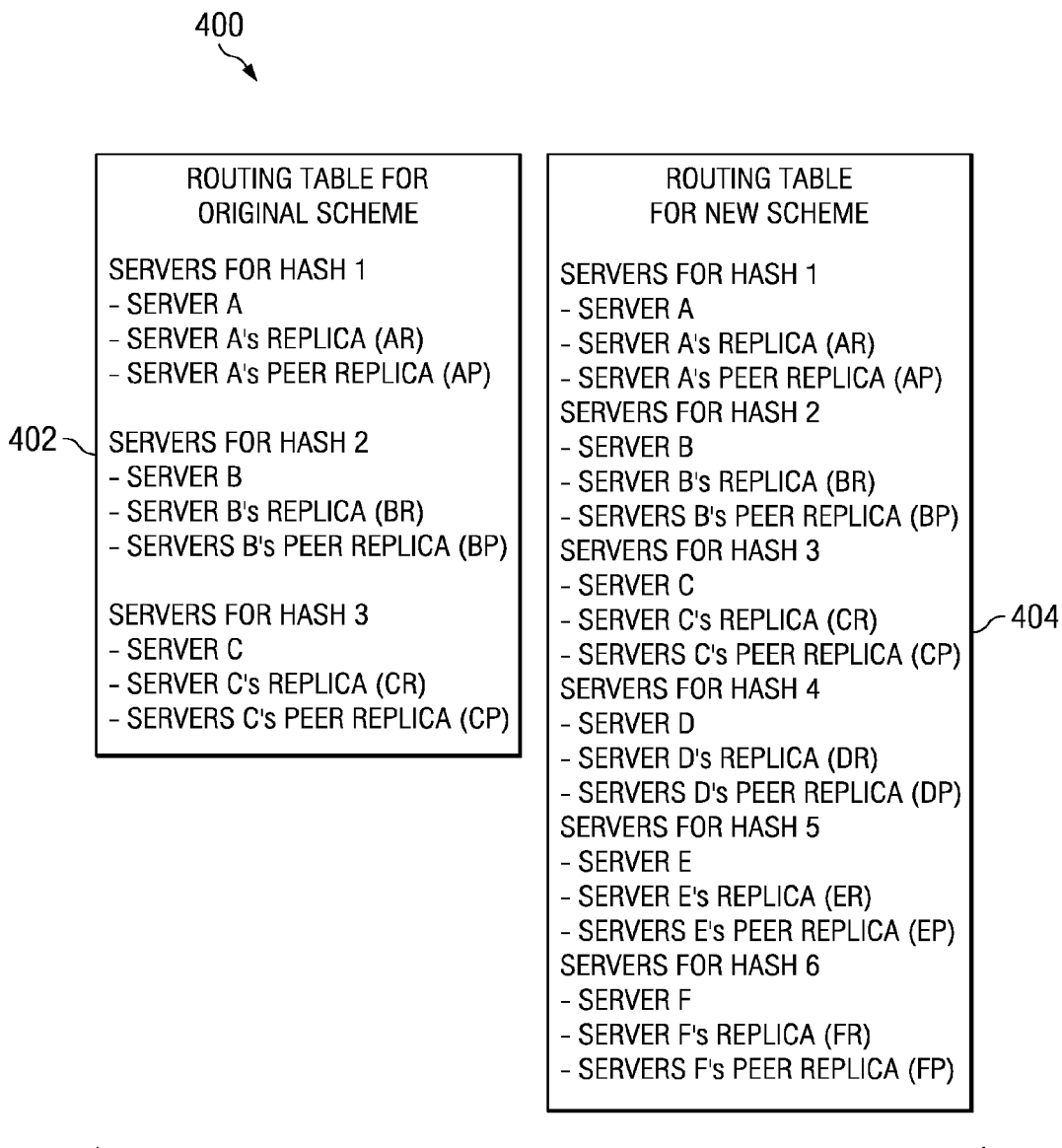

With reference now to FIG. 4A, the routing tables 400 of a proxy server participating in the repartitioning of entries in an illustrative embodiment are shown. Entries found in routing table 402 represent data entries before the planned repartitioning. Entries of routing table 404 represent those entries after the planned repartitioning.

During the repartitioning, the proxy server controlling the move would contain both old, first distribution, and new, second distribution, configuration data to find the data to be moved and to determine where to place the moved data. The old configuration, prior to the move, indicates the data source or first distribution, while the new configuration, after the move, indicates the target data location or second distribution. The pair of configurations is required by the proxy server controlling the move. A sample pair of configurations may be found in FIGS. 4B1-4B3.

With reference now to FIGS. 4B1-4B3, a sample proxy server configuration in accordance with an embodiment of the present invention is depicted. At 410 is shown the attribute MoveInProgress which may be either TRUE, indicating a move of data entries is in progress, or FALSE, indicating normal mode of operation and no move in progress. Element 412 indicates which partitioning algorithm to use when partitioning data entries is performed. Element 414 indicates the set of entries applicable to Server 1. Similar entries for Server 2 and Server 3 were omitted. Element 416 indicates there are 3 partitions over which to spread the data entries. This numbers corresponds with the entries for Server 1, 2, and 3.

Element 418 indicates the split point at which the data entries are to be partitioned. All entries above this qualifier are not candidates for a move or relocation during a repartitioning. Element 420 indicates Server 1 contains data entries resolving to the $1^{st}$ partition. Similar entries for Server 2 and Server 3 have been omitted.

Element 422 indicates the start of entries for the new configuration, having thus been identified with the NewPartitioning qualifier. Element 424 is the entry for Server 1 under the new partitioning definition. Similar entries defining Servers 2-5 have been omitted. Element 426 contains the indication for the split point above which data entries will be ignored and not candidates for relocation as well as indicating this set of definitions pertains to the new configuration. As before, element 428 indicates the number of partitions to be used in the repartitioning of data entries, in this case 6 rather than 3 as before. The data entries below the split point will now be located across 6 partitions. As before, the split point identified in element 430 remains the same as in the old configuration definitions. Element 432 provides an indication that the first set of repartitioned data entries will be on Server 1 as further defined by element 434 having the index value of 1.

Figure 5:
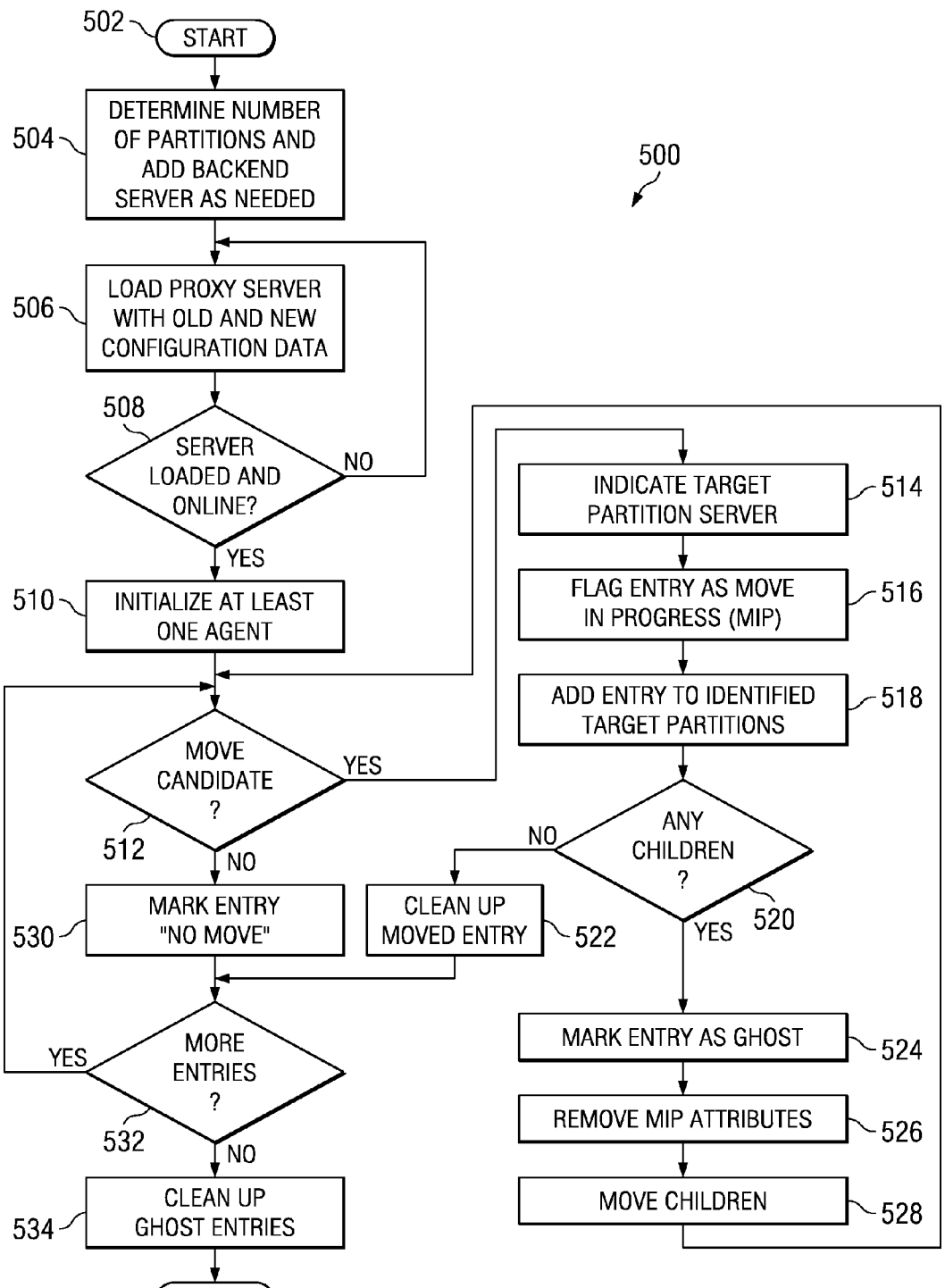
FIG. 5 is a flow chart of a process of repartitioning a plurality of directory servers in accordance with illustrative embodiments.

With reference to FIG. 5, process 500 of repartitioning in accordance with illustrative embodiments is represented as a series of operations. Activity commences at operation 502 then proceeds to determine the desired number of partitions over which the data entries are to be dispersed, and therefore, typically the number of back-end servers (operation 504). Having made this determination the proxy server controlling the move is loaded with both the old configuration information, that forms a first configuration, and the new configuration information, that forms a second configuration, enabling the proxy server to know where to find the entries as well as where to place the repartitioned entries (during operation 506). The proxy server is also flagged with a "move in progress" attribute. All participating proxy servers must be readied prior to commencing repartitioning activities.

The availability of the source and target servers is then determined (operation 508). At least one server is typically required per partition. Having determined servers are available, "yes" at operation 508, at least one agent to perform the movement of entries is loaded (operation 510) otherwise servers are not ready and the process reverts operation 506.

It may be appreciated, by one skilled in the art, more move agents, rather than fewer agents, would be needed to handle the movement of data entries involving a plurality of servers. The agents open connections to each of the back-end servers and to one or more of the proxy servers. The agents need the connection to the proxy server to get the old and new routing and configuration information, and the connections to all the back-end servers are needed to move the entries. The agents may typically be implemented in any of the following ways: as part of the back-end server, as part of the proxy server, or as a stand alone process.

A move agent that provides physical distributor means for redistributing the data in the distributed database, in combination with information on the proxy server or servers, is initialized (operation 510) and examines each entry to determine if the respective entry is a candidate for a move (operation 512). Data entries identified above the split point defined in the new configuration of the respective proxy server, in a different sub-tree or otherwise out of scope of the split are ignored. If the current entry is found not to be a candidate, "no in operation 512, the entry is marked, with an attribute such as ibm-slapdAddedPartScheme, containing the value of the new number of partitions in the new configuration indicating, "no move" (operation 530). This will prevent the entry from further attempts to move. A determination is then made regarding a need to process more entries (operation 532). If a "yes" in operation 532 then processing returns to operation 512, otherwise the process to clean up and remove any remaining ghost entries is performed (operation 534) with processing terminating thereafter at operation 536.

If as determined, the entry is a move candidate, "yes" in operation 512, the process then indicates the target partition server to be used (operation 514). Typically, the target partition determination is calculated by known methods such as employing a hashing function to the entry. Next the entry about to be moved has an attribute indicating a move in progress added (operation 516).

The move candidate is relocated to the identified target partition (operation 518). A determination is then made with respect to children related to the entry just moved (during operation 520). If "no" in operation 520, then any necessary clean up resulting from the move of the entry is performed (operation 522). However if "yes" in operation 520, a child entry is found, then the entry, a parent, is marked with a special referral attribute as a "ghost" entry (operation 524) as indicated, for example, in element 308 of FIG. 3A.

A parent entry previously marked as a "ghost" having completed relocation during the repartitioning process may then have the "move in progress" attribute removed (operation 526). The object is still maintained in the source server while children are being moved to prevent the children from being orphaned (operation 528). The process then returns to move the remaining identified entries (operation 514).

The sample process while in accordance with illustrative embodiments, also permits alternatives, such as agents, moving more than a single entry at a time. The agents could also mark the entries then move the entries in a later step; however, agents may have to iterate through the entries multiple times. For example, an agent determines a move is required and to which partition. The data entry may then be marked with two new attributes, such as, ibm-slapdnewTarget Partition=<number of target partition>and ibm-slapdNewPartScheme=<number of partitions on new scheme>. Having marked all entries, agents would return and perform the move as described previously based on the values of these attributes. If no move is required, the same ibm-slapdAddedPartScheme attribute, as stated previously, is added to the entry to indicate no move is required. If a move is required the entry is marked as "move in progress" and processed as previously described from that point. When the agent is done with that data entry, the attributes ibm-slapd-NewPartScheme and ibm-slapdNewTargetPartition are deleted.

A request to add a new entry will result in the proxy server performing a search to the old partition to locate the entry. If the object does not exist, the proxy server will add the entry based on the new partitioning algorithm and will set the operational attribute ibm-slapdAddedPartScheme=<number of partitions on new scheme>. If the object already exists, an appropriate error will be returned. If the parent entry exists in the old partitioning scheme, the entry is added based on the old scheme and the ibm-slapdAddedPartScheme attribute is left off, so that the agents know the entry needs to be examined to see if a move is required.

In the search for a specific entry, the proxy server will first attempt to search for the entry based on the old partitioning scheme. If the object is returned as a ghost entry referral, or no such object, the proxy will re-route the request based on the new partitioning scheme.

For sub-tree searches, the complete set of all servers in both the old and new partitioning schemes is searched. The proxy server simply throws out any requests that came back as ghost entries. An alternative would be to send a control requesting that the back-end does not return ghost entries as in a filtered request.

With a modify request, the proxy server will first attempt to modify the entry based on the old partitioning scheme. If the object does not exist, or is a ghost object, the back-end server will not accept the modify request. The proxy server will then attempt the same request on the new partition.

For a compare request, the proxy server will first attempt the compare based on the old partitioning scheme. If the object does not exist, or is a ghost object, the back-end server will not accept the compare request. The proxy server will then attempt the same request on the new partition.

A delete request is a special request because it involves the subsequent group Referral Index (RI) work and the associated cleanup of ghost entries. The proxy server will first attempt the delete request based on the old partitioning scheme. The back-end server will not accept the delete requests on ghost entries, instead a referral is returned. At this point, the proxy server will check to see if there are child entries for the ghost entry that have not been moved. If there are child entries, the proxy server will return unwilling to perform the request. If there are no children, the proxy server will then attempt the same request on the new partition. Once that delete passes, the proxy server must delete the ghost entry. This has to be done so a new entry with the same Domain Name (DN) could be added while the move is in progress. To perform this action, the proxy sends a delete request with a special control to force the delete action.

A ModRDN is another special request in which must be considered a move that moves the entry from one partition to another. Assuming that cross-partition moves are not supported, an algorithm may be used wherein the proxy server first locates the entry, either in the old partition or the new partition. If the entry is in the old partition, the proxy server then checks that the move is not across partitions within the old scheme, and then tries the ModRDN request. If the entry is in the new partition, the proxy server then checks that the move is not across partitions within the new scheme. If entries must be moved across partitions then the original entry is marked as "move in progress" by using the MoveInProgress=true attribute. The entry is added to the new target server with the new DN, and the original entry is deleted.

The back-end servers will not process requests for a specific entry when the entry is marked "move in progress" unless the request is from the agent identified by a special bind DN. This is done to avoid conflicts, or lost updates. Moving an entry will generally take less than 1 second; therefore, requests that impact an entry marked as "move in progress" typically will be delayed 1 second or less.

To reduce the number of places the proxy server has to look for specific entries, the proxy may store entries in a local cache indicating if the entries have already been moved to the new partitioning algorithm.

As the agent or agents process the data entries, state information is maintained in a persistent memory location, such as the Directory Information Tree (DIT) or other storage location, used to keep database control type information. Should there be a failure during processing, the information contained in the DIT may be used to recover or restart the agent. In addition, upon completion of the repartitioning and relocation of the various data entries, an indication containing a unique move identifier is placed in the DIT. This may be used by the proxy server to determine the status of the repartitioning from which the proxy may then determine completion of the repartitioning.

Further, the proxy server may register for a persistent search against all the back-end servers for the unique move complete entries. The move complete entry is an entry stored under cn=localhost. For example cn=movecomplete+numpartitions=6, cn=localhost. The agents will update the entry on a back-end server, when all the entries have been moved. When all servers have this entry, the proxy server switches to the new partitioning scheme and all servers are no longer in "move in progress" mode.

Typical repartitioning will be scheduled to occur based on a predetermined time or system activity. For example, one may request repartitioning to commence at a specified time of day, between set hours of the day or some other calendar related timing. System activity or workload based commencement may also be used such as whenever a threshold value of a number of threads active is met or whenever a specified number of operations per period of time is met. Typically, repartitioning will occur during periods of low activity for the data repository as one would expect overall performance of the repository to decline while the data entries are being repartitioned. Performance after the repartitioning would typically be the same as or better than performance prior to repartitioning and may depend upon factors not related to the repartitioning.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium of a recordable type medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is a transmission type medium, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for redistributing data in a distributed database comprising:
routing requests to a set of servers by means of a proxy server, wherein each server of the set of servers having a respective portion of the distributed database resident thereon;
responsive to a redistribution request to redistribute the distributed database among the set of servers from a first distribution to a second distribution, setting a flag in the proxy server indicating that redistribution is in progress;
storing configuration data for the first distribution and the second distribution in the proxy server;
redistributing the data in the distributed database in accordance with the configuration data; and
wherein storing the configuration data identifies a predetermined split point.

2. The method of claim 1, wherein redistributing the data in the distributed database occurs selectively during periods of low database usage.

3. The method of claim 1, wherein redistributing the data in the distributed database records state information, in a storage location, indicative of the redistribution progress.

4. The method of claim 1, wherein redistributing the data in the distributed database further comprises:
marking an entry with an operational attribute indicating one of "move in progress", moved, no move and a special referral object.

5. The method of claim 1, wherein redistributing the data in the distributed database further comprises at least one agent capable of moving database entries as one of a single entry and a multiple of entries.

6. A data processing system for redistributing data in a distributed database, the data processing system comprising:
a set of servers, each of which having a respective portion of the distributed database resident thereon;
a router, routing requests to the set of servers by means of a proxy server;
attribution means responsive to a redistribution request to redistribute the distributed database among the set of servers from a first distribution to a second distribution, setting a flag in a the proxy server indicating that redistribution is in progress;
storage means for storing configuration data for the first distribution and the second distribution in the proxy server;
distributor means for redistributing the data in the distributed database in accordance with the configuration data; and
wherein the storage means for storing the configuration data identifies a predetermined split point.

7. The data processing system of claim 6, wherein the distributor means redistributes the data in the distributed database occurs selectively during periods of low database usage.

8. The data processing system of claim 6, wherein the distributor means further records state information, in a storage location, indicative of the redistribution progress.

9. The data processing system of claim 6, wherein the distributor means for redistributing the data in the distributed database further comprises:
marking an entry with an operational attribute indicating one of "move in progress", moved, no move and a special referral object.

10. The data processing system of claim 6, wherein the distributor means for redistributing the data in the distributed database further comprises at least one agent capable of moving database entries as one of a single entry and a multiple of entries.

11. A computer program product for redistributing data in a distributed database, embodied in a recordable type medium, the computer program product comprising computer executable instructions comprising:
computer executable instructions for routing requests to a set of servers by means of a proxy server, wherein each sewer of the set of servers having a respective portion of the distributed database resident thereon;
computer executable instructions responsive to a redistribution request to redistribute the distributed database among the set of servers from a first distribution to a second distribution, setting a flag in the proxy server indicating that redistribution is in progress;
computer executable instructions for storing configuration data for the first distribution and the second distribution in the proxy server;
computer executable instructions for redistributing the data in the distributed database in accordance with the configuration; and
wherein the computer executable instructions for storing the configuration data comprises computer executable instruction to identify a predetermined split point.

12. The computer program product of claim 11, wherein the computer executable instructions for redistributing redistributes the data in the distributed database selectively during periods of low database usage.

13. The computer program product of claim 11, wherein the computer executable instructions for redistributing farther comprises computer executable instructions for recording state information, in a storage location, indicative of the redistribution progress.

14. The computer program product of claim 11, wherein the computer executable instructions for redistributing the data in the distributed database further comprising computer executable instructions for marking an entry with an operational attribute indicating one of "move in progress", moved, no move and a special referral object.

15. The computer program product of claim 11, wherein the computer executable instructions for redistributing the data in the distributed database further comprising computer executable instructions for at least one agent capable of moving database entries as one of a single entry and a multiple of entries.

* * * * *